G. DUNN.
BRUSH RIGGING FOR DYNAMO ELECTRIC MACHINES.
APPLICATION FILED JAN. 2, 1908.

922,107.

Patented May 18, 1909.

Witnesses:
Samuel W. Balch
Frank C. Cole

Inventor
Gano Dunn,
by Thomas Ewing Jr.
Attorney

UNITED STATES PATENT OFFICE.

GANO DUNN, OF EAST ORANGE, NEW JERSEY, ASSIGNOR TO CROCKER-WHEELER COMPANY, OF AMPERE, NEW JERSEY, A CORPORATION OF NEW JERSEY.

BRUSH-RIGGING FOR DYNAMO-ELECTRIC MACHINES.

No. 922,107.  Specification of Letters Patent.  Patented May 18, 1909.

Application filed January 2, 1908. Serial No. 408,876.

*To all whom it may concern:*

Be it known that I, GANO DUNN, a citizen of the United States of America, and a resident of East Orange, county of Essex, and State of New Jersey, have invented certain new and useful Improvements in Brush-Rigging for Dynamo-Electric Machines, of which the following is a specification.

The object of this invention is to produce a brush-rigging of rigid mechanical construction, thereby preventing vibration, which is simple and compact and in which the insulation is effective. To this end, the brush-holder is mounted on a brush-stud which projects from the supporting part, the brush-holder being insulated from the supporting part by insulation placed between the brush-holder and the stud and not between the stud and the supporting part, whereby the stud will be electrically dead, and the connection between the supporting part and stud, which is subjected to the severest strain of any of the parts forming the brush-rigging, can be made with extreme rigidity.

Figure 1:
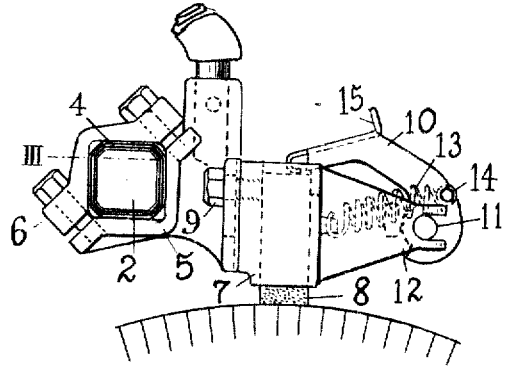
Figure 2:
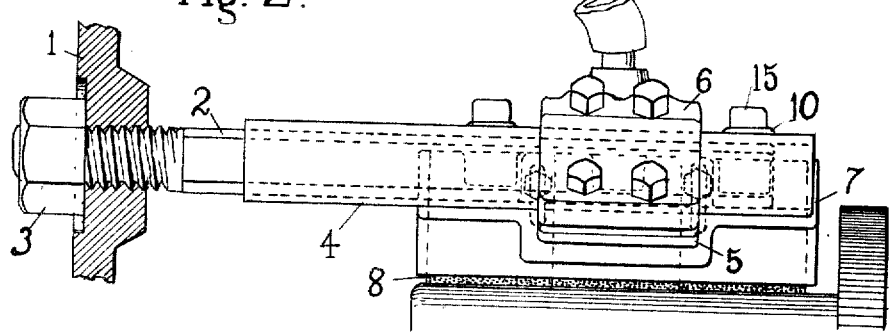
Figure 3:
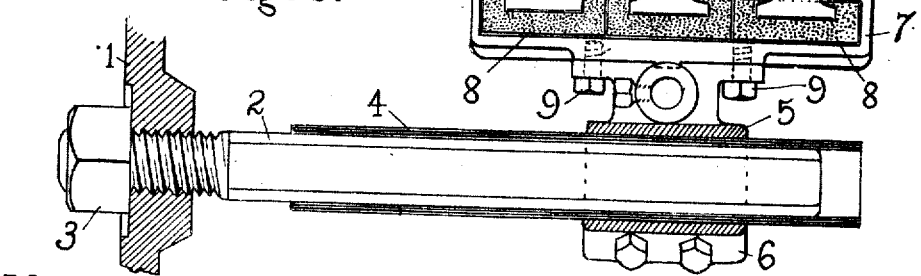

In the accompanying sheet of drawings which forms a part of this specification, Figure 1 is an end view of the brush-rigging, together with a portion of the commutator. Fig. 2 is a side view of the same. Fig. 3 is a top view with the clamping parts of the brush-holder broken away on the line III of Fig. 1.

The brush-rigging as illustrated comprises a supporting part 1 which may be any part of the framework of the motor or any part capable of being secured in fixed relation to the motor-framework and utilized for the support of the rest of the brush-rigging, as, for example, an end-shield such as is illustrated in United States Patent No. 792,762 granted June 20, 1905. This shield, at the point where the brush-rigging is most conveniently connected, is usually a thin web or arm. It is preferably thickened somewhat or provided with a low boss at the point where a brush-stud 2 is to be attached. This boss is drilled, and in the embodiment illustrated also tapped to receive the threaded end of the brush-stud which is screwed tightly therein without interposed insulation. When the stud is screwed in as illustrated, it is unnecessary to face off the end-shield on the brush side, but only on the opposite side against which a jam nut 3 is screwed. The invention, however, is not limited to this screw-threaded construction, but only to a construction in which the brush-stud is secured thereto directly, that is to say, by a snug metallic fit of any character which will insure rigidity of support for the stud without materially increasing the thickness of the supporting part at the point of attachment and providing a long hole for the stud to pass through or providing large clamping faces, as is required when insulation is interposed, since insulation is only to be obtained in materials which have not the strength and rigidity of metal. The stud is conveniently formed of cold rolled steel turned down and threaded at one end and the rest, which projects, is given any polygonal form which will afford security against rotating to the brush-holder clamped thereon or even a circular form. In the form shown this is obtained by cutting or forging flattened faces on round stock to give a shape which is approximately rectangular with rounded corners.

A tube of insulation 4 covers the greater portion of the projecting rectangular end of the stud and preferably extends beyond the end so as to provide as great a surface distance as possible to reduce the creepage between the parts to be insulated from each other. This insulation tube as shown is formed of several turns or layers of wetted asbestos paper, and over this a layer of shellacked mica board lapping on one side, the whole being baked under pressure, but it may also be formed of paper or cloth or tape or any other similar substance. The brush-holder comprises a base or saddle 5 and a cap 6, which form clamping parts engaging the projecting end of the stud over the insulation tube, and a rectangular frame 7 which constitutes a guide and holder for carbon brushes 8 8. The saddle and frame are separate parts held together in adjustable relation by screws 9 9 which pass through slots in the base. The brush-holder is thus formed with split clamping parts which when opened can be slipped over the insulation tube and then drawn down on the sides of the stud outside the insulation.

Each brush is engaged and pressed against the commutator by a forked lever 10 formed of sheet metal. Rivets 11 11 in the forks of the lever form trunnions at the fulcrum points and rest in pillow-blocks 12 12 which project from one side of the brush-holder frame. A spiral tension spring 13 is stretched between an eye on one side of the brush-holder frame and a spring-pin 14 which is laid across the forks of the lever. The spring operates to keep the trunnions in place in the pillow-blocks as well as to hold the end of the lever against the top of the brush. The lever is formed with a thumb-piece 15 by which it may be drawn back so as to bring the line of strain of the spring across the center of the fulcrum or on the other side so that the lever will rest out of action or may be unshipped for conveniently removing and replacing brushes.

What I claim as new and desire to secure by Letters Patent of the United States is—

1. In a brush-rigging, the combination with a supporting part, of a projecting brush-stud one end of which is rigidly secured thereto directly, an insulation tube surrounding the projecting part of the brush-stud, and a brush-holder clamped to the sides of the brush-stud outside the insulation, substantially as described.

2. In a brush-rigging, the combination with a supporting part, of a polygonal projecting brush-stud one end of which is rigidly secured thereto directly, an insulation tube surrounding the projecting part of the brush-stud, and a brush-holder clamped to the sides of the brush-stud outside the insulation, substantially as described.

3. In a brush-rigging, the combination with a supporting part, of a projecting brush-stud one end of which is rigidly secured thereto directly, an insulation tube surrounding the projecting part of the brush-stud, and a brush-holder with split clamping parts clamped to the sides of the brush-stud outside the insulation, substantially as described.

4. In a brush-rigging, the combination with a supporting part, of a polygonal projecting brush-stud one end of which is rigidly secured thereto directly, an insulation tube surrounding the projecting part of the brush-stud, and a brush-holder with split clamping parts clamped to the sides of the brush-stud outside the insulation, substantially as described.

Signed by me at East Orange, N. J., this 30th day of December, 1907.

GANO DUNN.

Witnesses:
H. C. HARRISON,
HENRY J. FULLER.